(12) United States Patent
Mess

(10) Patent No.: US 7,388,504 B2
(45) Date of Patent: Jun. 17, 2008

(54) RFID STANDOFF LABEL AND METHOD OF USE

(75) Inventor: Steven H. Mess, Franklin, WI (US)

(73) Assignee: Brady Worldwide, Inc., Milwaukee, WI (US)

( * ) Notice: Subject to any disclaimer, the term of this patent is extended or adjusted under 35 U.S.C. 154(b) by 228 days.

(21) Appl. No.: 11/293,436

(22) Filed: Dec. 2, 2005

(65) Prior Publication Data

US 2007/0126588 A1    Jun. 7, 2007

(51) Int. Cl.
G08B 13/14 (2006.01)
(52) U.S. Cl. .............. 340/572.8; 340/572.1; 340/572.4; 340/572.7; 343/795; 343/846; 343/848; 343/895; 235/492
(58) Field of Classification Search .......... 340/572.1, 340/572.4, 572.7, 572.8; 343/795, 846, 848, 343/895; 235/375, 376, 385, 492
See application file for complete search history.

(56) References Cited

U.S. PATENT DOCUMENTS

| | | | |
|---|---|---|---|
| 6,118,379 A | 9/2000 | Kodukula et al. | |
| 6,206,282 B1 | 3/2001 | Hayes, Sr. et al. | |
| 6,307,517 B1 | 10/2001 | Lee | |
| 6,451,154 B1 | 9/2002 | Grabau et al. | |
| 6,486,783 B1 | 11/2002 | Hausladen et al. | |
| 6,569,508 B2 | 5/2003 | Babb et al. | |
| 6,825,754 B1 | 11/2004 | Rolin | |
| 6,914,562 B2 | 7/2005 | Forster | |
| 6,940,408 B2 * | 9/2005 | Ferguson et al. | 340/572.7 |
| 7,259,678 B2 * | 8/2007 | Brown et al. | 340/572.8 |
| 2004/0091659 A1 | 5/2004 | Banks et al. | |
| 2005/0085010 A1 | 4/2005 | Tsunoda et al. | |

FOREIGN PATENT DOCUMENTS

WO    WO 2004/093246 A2    10/2004

* cited by examiner

*Primary Examiner*—Hung Nguyen
(74) *Attorney, Agent, or Firm*—Quarles & Brady LLP

(57) ABSTRACT

A RFID label suitable for use on a metal support surface. In one embodiment, the RFID label includes a substrate having a downwardly extending integral leg. RFID circuitry is disposed on the substrate adjacent to the leg which spaces the RFID circuitry from the support surface to reduce interference from the support surface.

21 Claims, 3 Drawing Sheets

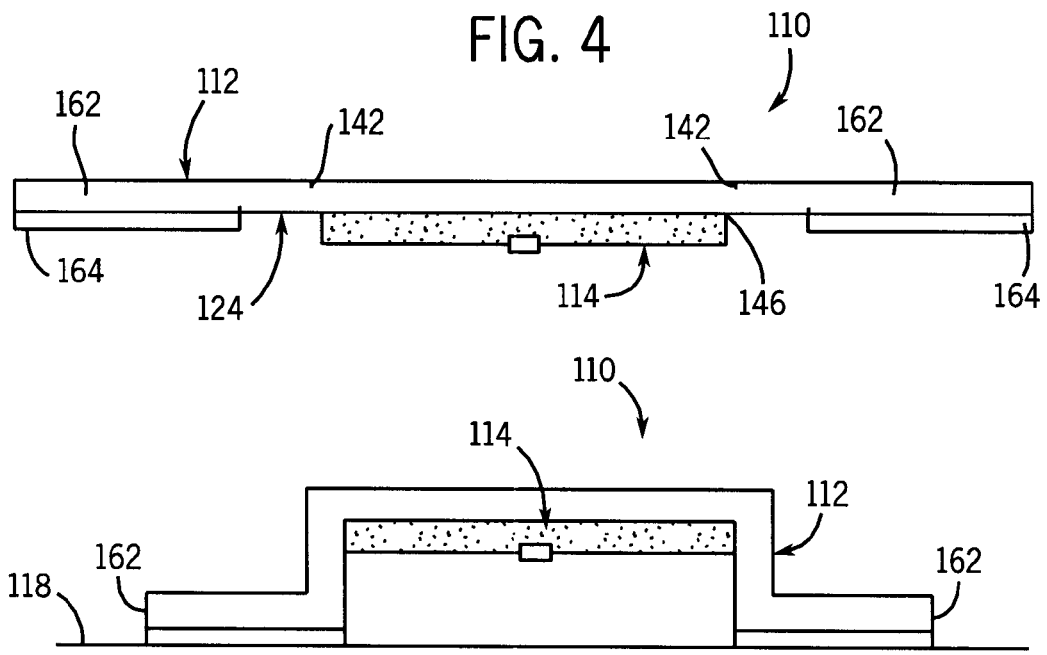
FIG. 4
FIG. 5
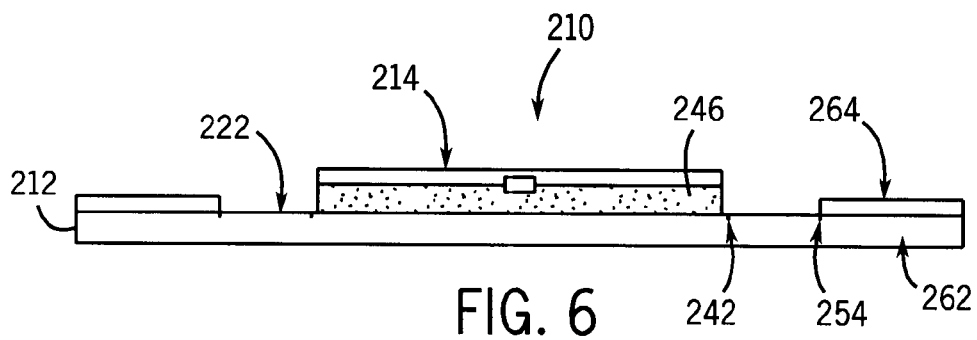
FIG. 6
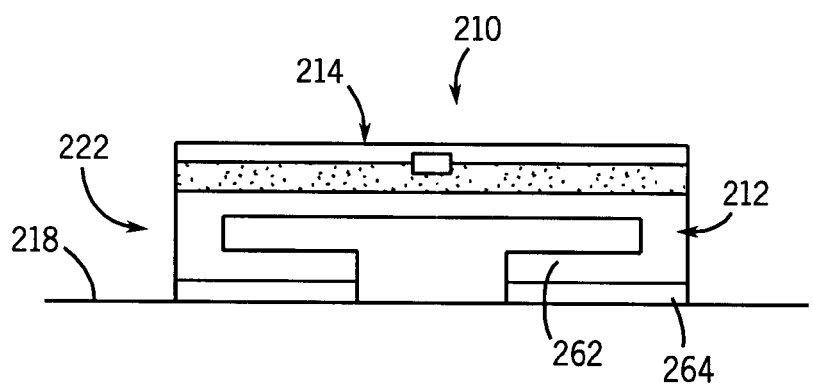
FIG. 7

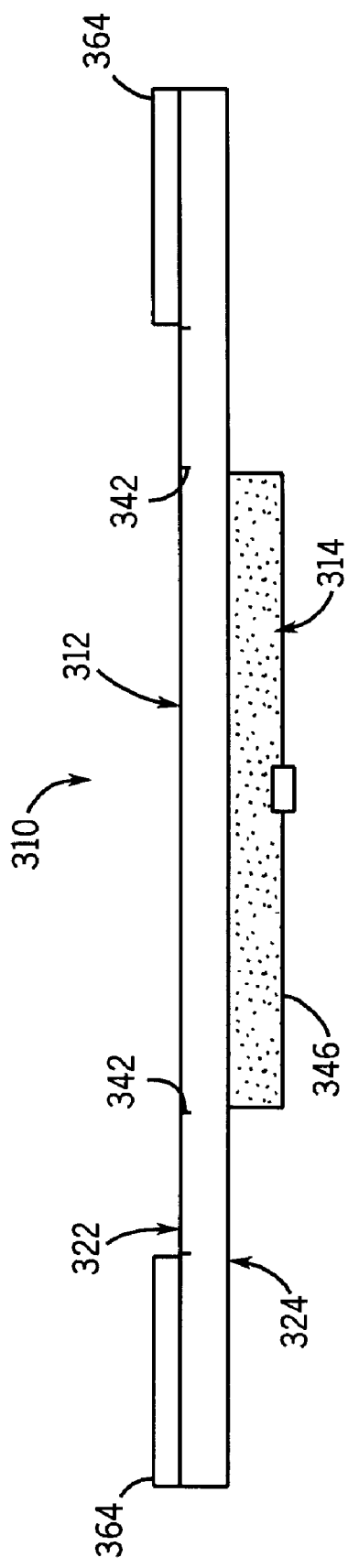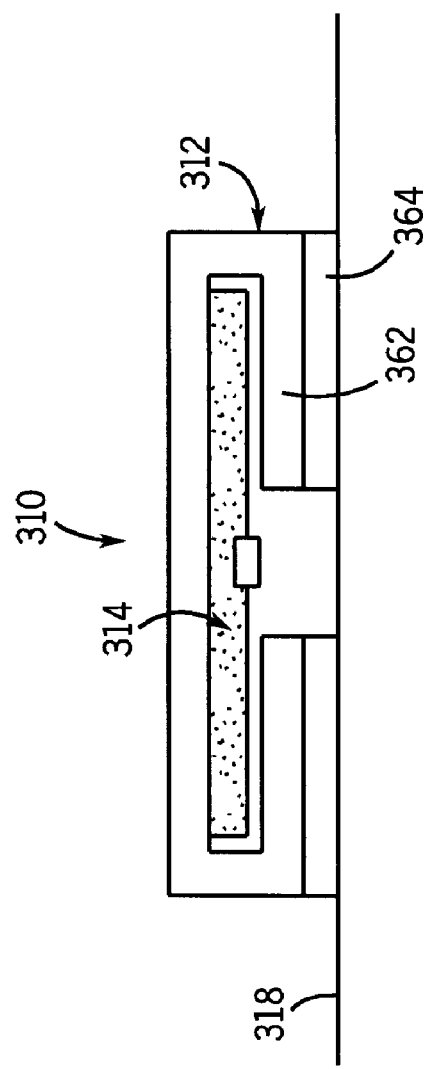

RFID STANDOFF LABEL AND METHOD OF USE

CROSS REFERENCES TO RELATED APPLICATIONS

Not Applicable.

STATEMENT REGARDING FEDERALLY SPONSORED RESEARCH

Not Applicable.

TECHNICAL FIELD

This invention relates to Radio Frequency Identification (RFID) labels, and in particular to a RFID label suitable for use on a metal object.

DESCRIPTION OF THE BACKGROUND ART

RFID devices are known in the art, such as disclosed in U.S. Pat. No. 5,347,263. These devices are used in systems for access control, animal feeding and health programs, inventory control, process control, and security applications.

A typical RFID system has a passive RFID label including RFID circuitry therein and a separate RFID reader/writer. The RFID reader/writer energizes the RFID circuitry by transmitting a power signal. The power signal may convey data which is stored in memory incorporated in the RFID circuitry. In response to the power signal the RFID circuitry may transmit a response signal containing data stored in its memory. The RFID reader/writer receives the response signal and interprets the data contained therein. The data is then transmitted to a host computer for processing.

RFID labels do not function properly when they are in very close proximity to metal. The metal attenuates the response signal from the RFID circuitry and reduces the read range, i.e. the distance from which the RFID reader/writer can receive the response signal, of the RFID label. In order to minimize the interference caused by a metal supporting surface, a spacer layer forming part of the RFID label is often used. The spacer layer is typically a piece of die cut foam adhesively fixed to a substrate on which the RFID circuitry is disposed. The spacer layer spaces the RFID circuitry from the metal supporting surface to increase the read range of the RFID label. Unfortunately, the thickness of the spacer layer often causes the RFID label to jam when used in a printer. As a result, RFID labels for use on metal support surfaces are often fed through a printer prior to affixing a spacer layer. This added step of affixing the spacer layer after printing reduces the usefulness of the RFID label and increases the cost of use.

SUMMARY OF THE INVENTION

The present invention provides a RFID label suitable for use on a metal support surface and method of use. In one embodiment, the RFID label includes a substrate having a downwardly extending integral leg. RFID circuitry is disposed on the substrate adjacent to the leg which spaces the RFID circuitry from the support surface to reduce interference from the support surface.

An objective of the present invention is to provide a RFID label suitable for use on a metal support surface. This objective is accomplished by providing a RFID label with a leg that spaces the RFID circuitry from the metal support surface to reduce interference from the support surface.

The foregoing and other objectives and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

BRIEF SUMMARY OF THE DRAWINGS

FIG. 4 is an elevation view of a second embodiment of an RFID label incorporating the present invention;

FIG. 5 is an elevation view of the RFID label of FIG. 4 folded at the fold lines;

FIG. 6 is an elevation view of a third embodiment of an RFID label incorporating the present invention;

FIG. 7 is an elevation view of the RFID label of FIG. 6 folded at the fold lines;

FIG. 8 is an elevation view of a fourth embodiment of an RFID label incorporating the present invention; and FIG. 9 is an elevation view of the RFID label of FIG. 8 folded at the fold lines.

DETAILED DESCRIPTION OF THE PREFERRED EMBODIMENTS

Figure 1:
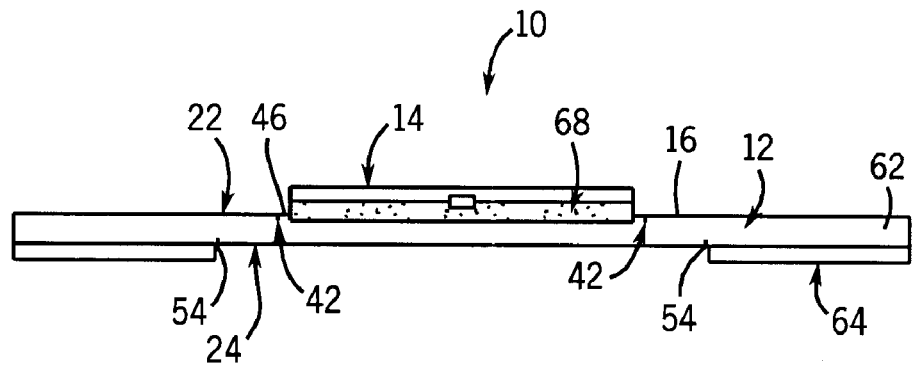
FIG. 1 is an elevation view of a RFID label incorporating the present invention.
Figure 2:
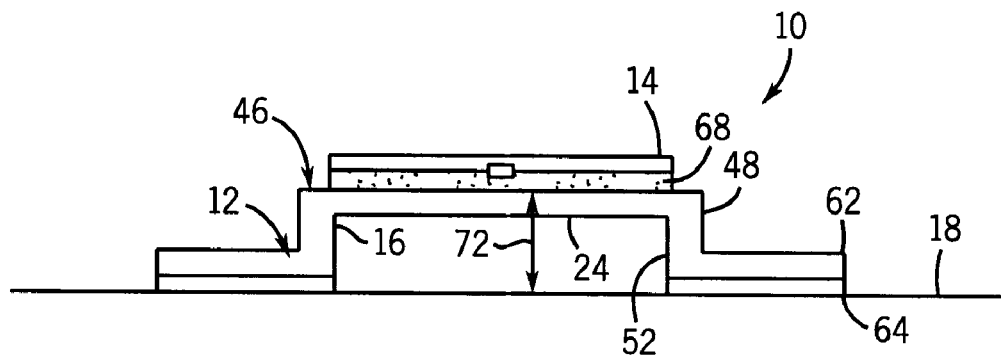
FIG. 2 is an elevation view of the RFID label of FIG. 1 folded at the fold lines.
Figure 3:
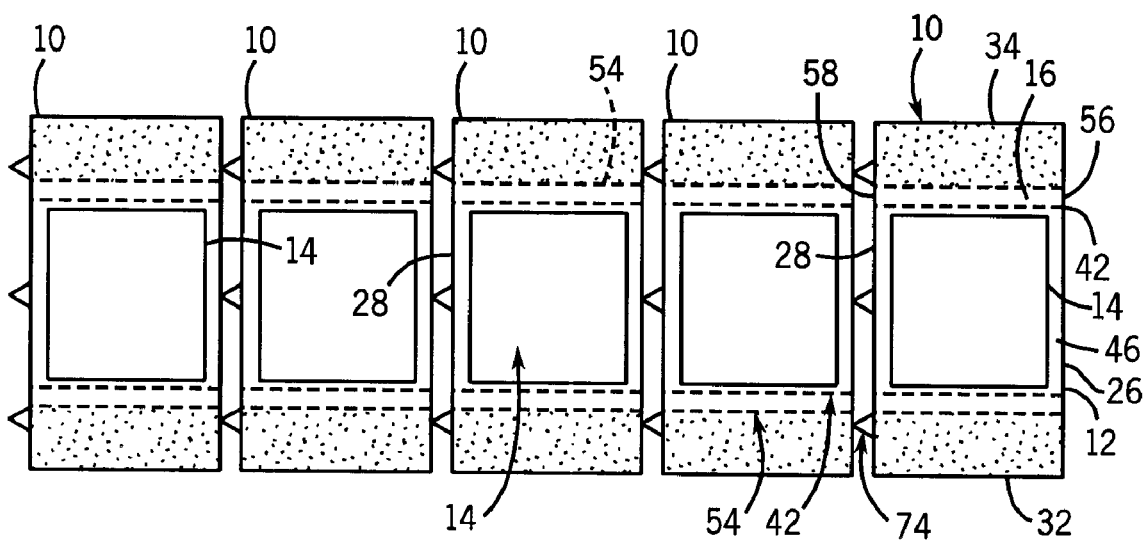
FIG. 3 is a plan view of a plurality of the RFID labels of FIG. 1 in strip form.

Referring to FIGS. 1-3, a RFID label 10 incorporating the present invention includes a substrate 12 on which RFID circuitry 14 is disposed. Legs 16 forming part of the label 10 space the RFID circuitry 14 from a supporting surface 18, such as formed from metal. The legs 16 space the RFID circuitry 14 from the supporting surface 18 to increase the read range of the RFID circuitry 14.

The substrate 12 is preferably a stiff card stock, such as formed from a 0.010 inch thick polyethylene terapthalate (PET) sheet having an upper surface 22 and a lower surface 24. In the embodiment disclosed herein, the substrate 12 is rectangular having opposing sides 26, 28 joined by ends 32, 34. Of course, the substrate 12 can have any multi-sided polygonal shape, such triangular, pentagonal, star, and the like, or non-polygonal shape, such as circular, free form, and the like, without departing from the scope of the invention.

The substrate 12 is folded along leg fold lines 42 extending across a portion of the substrate 12, such as between the sides 26, 28 of the substrate 12, to form the integral legs 16. The leg 16 extends downwardly from an RFID support area 46 on the substrate 12. The RFID support area 46 in the embodiment disclosed in FIGS. 1-3 is defined between the leg fold lines 42. Preferably, the leg fold lines 42 are formed in the substrate 12, such as scores, a preformed crease, or perforations in the substrate, to predefine the leg 16 length and make the substrate 12 easier to fold. In other embodiments, however, the leg fold lines 42 are designated by a line formed on one of the substrate surfaces, such as by printing, or not predefined at all prior to folding the substrate.

Although two legs 16 are shown and described, one or more legs 16 can be used without departing from the scope of the invention.

Each leg fold line 42 defines a proximal end 48 of the leg 16 which extends toward a distal end 52 defined by a foot fold line 54 extending across a portion of the leg 16, such as between sides 56, 58 of the leg 16. The substrate 12 is folded outwardly along the foot fold line 54 to define a foot 62. Preferably, the foot fold line 54 is formed in the substrate 12, such as scores, a preformed crease, or perforations in the substrate, to predefine the foot 62 length and make the substrate 12 easier to bend. In other embodiments, however, the foot fold line 54 is designated by a line formed on one of the substrate surfaces, such as by printing, or not defined at all prior to folding the leg portion of the substrate 12.

A pressure sensitive adhesive 64 applied to the lower surface 24 of the substrate 12 forming each foot 62 affixes the foot 62, and thus the substrate 12, to the supporting surface 18. Although a pressure sensitive adhesive 64 is preferred for ease of use, any adhesive known in the art, such as rubber-based, acrylic-based, and the like, can be used without departing from the scope of the invention.

The RFID circuitry 14, such as a 13.56 MHz TI Tag-It™ inlet, available from Texas Instruments Inc., Dallas, Tex., is mounted on the upper surface 22 of the substrate 12 forming the RFID support area 46 adjacent to the leg fold lines 42. In the embodiment disclosed in FIGS. 1-3, the RFID support area 46 is the upper surface 22 of the substrate 12 between the leg fold lines 42. However, as disclosed below, the RFID support area 46 can also be the lower surface 24 of the substrate 12 without departing from the scope of the invention. The RFID circuitry 14 can be mounted to the RFID support area 46 using any methods, known in the art, such as by attaching the RFID circuitry 14 using a pressure sensitive adhesive 68, as shown in FIGS. 1 and 2. Of course, other methods for providing RFID circuitry on the label 10, such as disclosed in U.S. Pat. No. 6,262,692, can be used without departing from the scope of the invention, and is fully incorporated herein by reference.

Advantageously, in an unfolded state shown in FIG. 1, the label 10 is flat and thin enough to be printed on using a printer, such as a thermal transfer printer. However, in the folded state shown in FIG. 2, a standoff 72 is created spacing the RFID circuitry 14 from the supporting surface 18 which allows the label 10 to be used on a metal supporting surface. In particular, the legs 16 space the RFID circuitry 14 from the supporting surface 18 to minimize interference from the supporting surface 18 and increase the read range of the RFID circuitry 14 without providing an additional layer of material between the RFID circuitry and support surface 18. Tests conducted by the inventor show that the length of the legs 16 affect the read range of the RFID circuitry 14 when used on a metal supporting surface. Table 1 shows the results of the test in which three RFID 13.56 MHz TI Tag-It™ inlets with a printable topcoat on one side and a pressure sensitive adhesive on the other was read using a Brady WavePoint® Reader. Each inlet was tested in the air, directly on an aluminum supporting surface, and as part of a label described above with varying standoffs attached to the aluminum supporting surface.

TABLE 1

|  | Inlet #1 Read Distance | Inlet #2 Read Distance | Inlet #3 Read Distance |
|---|---|---|---|
| In air | 3⅛" | 3" | 3" |
| On a 0.035" thick aluminum panel | NO READ | NO READ | NO READ |
| ¼" standoff on 0.035" aluminum panel | 1" | ⅞" | ¾" |
| ½" standoff on 0.035" aluminum panel | 1¾" | 2" | 1¾" |
| ¾" standoff on 0.035" aluminum panel | 2⅜" | 2½" | 2⅜" |

The labels 10 can be formed individually for use in a printer and manual marking. Alternatively, a plurality of the labels 10 can be produced in a strip form for use in a printer, such as shown in FIG. 3. In FIG. 3, the labels 10 are formed on a length of the substrate 12 forming a strip. Each label 10 is weakly linked to an adjacent label 10 to allow easy separation of an individual label 10, such as by joining adjacent links with die cut tabs 74, forming perforations in the substrate, and the like, between the labels 10. Of course, individual labels 10 can be removably fixed to a strip of material (not shown), such as a release liner adhesively fixed to the substrate of each label, without departing from the scope of the invention.

In a second embodiment of the present invention shown in FIGS. 4 and 5, the RFID circuitry 114 is disposed on the lower surface 124 of the substrate 112 forming the RFID support area 146 between the leg fold lines 142. An adhesive 164 is applied to the lower surface 124 of the substrate 112 defining each foot 162. As in the first embodiment, the feet 162 are folded outwardly and the adhesive 164 affixes the label 110 to a supporting surface 118. Advantageously, in this embodiment both the RFID circuitry 114 and adhesive 164 are applied to the same substrate surface 124 to simplify manufacturing.

In a third embodiment of the present invention shown in FIGS. 6 and 7, the RFID circuitry 214 is disposed on the upper surface 222 of the substrate 212 forming the RFID support area 246 between the leg fold lines 242. An adhesive 264 is applied to the upper surface 222 of the substrate 212 defining each foot 262. In this embodiment, the feet 262 are folded inwardly and the adhesive 264 affixes the label 210 to a supporting surface 218. Advantageously, as in the second embodiment described above, both the RFID circuitry 214 and adhesive 264 are applied to the same substrate surface 222. In addition, in this embodiment, the leg and foot fold lines 242, 254 are also formed in the same surface 222 of the substrate 212 to simplify manufacturing.

Finally, in a fourth embodiment, shown in FIGS. 8 and 9, the RFID circuitry 314 is disposed on the lower surface 324 of the substrate 312 forming the RFID support area 346 between the leg fold lines 342. An adhesive 364 is applied to the upper surface 322 of the substrate 312 defining each foot 362. As in the third embodiment, the feet 362 are folded inwardly and the adhesive 364 affixes the label 310 to a supporting surface 318.

The present invention is not limited to the above described applications, and one skilled in the art will be able to incorporate the present invention into other applications that fall within the scope of the claims. Moreover, while there has been shown and described what is at present considered the preferred embodiment of the invention, it will be obvious to those skilled in the art that various changes and modifications can be made therein without departing from the scope of the invention defined by the appended claims.

I claim:

1. A RFID label suitable for use on a metal support surface, said label comprising:
   a substrate having opposing first and second surfaces and a leg fold line extending across a portion of said substrate, said substrate being folded at said leg fold line to form a downwardly depending leg;
   RFID circuitry disposed on said first surface adjacent to said leg, said leg spacing said RFID circuitry from the support surface.

2. The RFID label as in claim 1, in which said substrate includes first and second sides, and said leg fold line extends between said first and second sides.

3. The RFID label as in claim 1, in which at least two leg fold lines extend across portions of said substrate, said substrate being folded at said at least two leg fold lines to form at least two downwardly depending legs, and said RFID circuitry being disposed on said first surface between two of said at least two legs.

4. The RFID label as in claim 1, in which a foot fold line extends across a portion of said leg, said leg being folded at said foot fold line to form a foot.

5. The RFID label as in claim 4, in which said leg fold line and said foot fold line are formed on the same surface of said substrate.

6. The RFID label as in claim 4, in which an adhesive is applied to said foot for affixing said foot to the support surface.

7. The RFID label as in claim 6, in which said adhesive and said RFID circuitry are disposed on the same surface of said substrate.

8. The RFID label as in claim 1, in which said leg fold line is formed in said substrate to make said substrate easier to fold.

9. A method of using a RFID label on a supporting surface, said method comprising:
   providing a RFID label including RFID circuitry disposed on a substrate;
   folding a first portion of said substrate along a leg fold line adjacent to said RFID circuitry to form an integral first leg adjacent to said RFID circuitry;
   affixing said RFID label to the supporting surface, wherein said at least one integral leg spaces said RFID circuitry from the supporting surface.

10. The method as in claim 9, including folding a second portion of said substrate to said RFID circuitry to form a second integral leg adjacent to said RFID circuitry, wherein said RFID circuitry is interposed between said first and second integral legs.

11. The method as in claim 9, including folding a portion of said first leg along a foot fold line to form a foot, and affixing said foot to the supporting surface.

12. The method as in claim 11, including applying an adhesive to said foot for affixing said foot to the supporting surface.

13. The method as in claim 9, including forming said leg fold line in said substrate to make said substrate easier to fold.

14. The method as in claim 9, in which said supporting surface is a metal surface.

15. A RFID label comprising:
    a substrate having first and second surfaces;
    an integral leg extending downwardly from said substrate for engaging a support surface;
    RFID circuitry disposed on said first surface adjacent to said leg, and said leg spaces said RFID circuitry from said support surface.

16. The RFID label as in claim 15, in which a proximal end of said leg is defined by a leg fold line formed in said substrate to make said substrate easier to fold.

17. The RFID label as in claim 15, in which a foot extends from a distal end of said leg.

18. The RFID label as in claim 15, in which a foot fold line extends across a portion of said leg, said leg being folded at said foot fold line to form said foot.

19. The RFID label as in claim 15, in which a leg fold line and said foot fold line are formed on the same surface of said substrate.

20. The RFID label as in claim 15, in which an adhesive is applied to said foot for affixing said foot to the support surface.

21. The RFID label as in claim 15, in which said adhesive and said RFID circuitry are disposed on the same surface of said substrate.

* * * * *